United States Patent
Prescher et al.

(10) Patent No.: US 8,610,808 B2
(45) Date of Patent: Dec. 17, 2013

(54) COLOR CMOS IMAGER WITH SINGLE PHOTON COUNTING CAPABILITY

(75) Inventors: Gordian Prescher, Cologne (DE); Carsten Degenhardt, Aachen (DE); Rob Ballizany, Knegsel (NL); Anja Schmitz, Aachen (DE); Thomas Frach, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 221 days.

(21) Appl. No.: 13/139,626

(22) PCT Filed: Nov. 19, 2009

(86) PCT No.: PCT/IB2009/055194
§ 371 (c)(1),
(2), (4) Date: Jun. 14, 2011

(87) PCT Pub. No.: WO2010/073137
PCT Pub. Date: Jul. 1, 2010

(65) Prior Publication Data
US 2011/0249148 A1 Oct. 13, 2011

Related U.S. Application Data

(60) Provisional application No. 61/139,739, filed on Dec. 22, 2008.

(51) Int. Cl.
*H04N 9/083* (2006.01)
*H04N 3/14* (2006.01)
*H04N 5/335* (2011.01)
*H04N 9/04* (2006.01)
*H01L 31/107* (2006.01)

(52) U.S. Cl.
USPC ............ 348/276; 348/302; 348/272; 257/438

(58) Field of Classification Search
USPC ........ 348/302–310, 135, 222.1, 223.1, 224.1, 348/273–281; 257/431–466
See application file for complete search history.

(56) References Cited

U.S. PATENT DOCUMENTS

| | | | | | |
|---|---|---|---|---|---|
| 4,003,655 | A | * | 1/1977 | Wasilko | 356/4.01 |
| 4,366,377 | A | * | 12/1982 | Notthoff et al. | 257/446 |
| 4,616,247 | A | * | 10/1986 | Chang et al. | 257/438 |
| 5,323,233 | A | * | 6/1994 | Yamagami et al. | 348/277 |
| 6,555,890 | B2 | * | 4/2003 | Dries et al. | 257/458 |

(Continued)

FOREIGN PATENT DOCUMENTS

| | | |
|---|---|---|
| WO | 2006014641 A2 | 2/2006 |
| WO | 2008036614 A1 | 3/2008 |

(Continued)

*Primary Examiner* — Chia-Wei A Chen

(57) ABSTRACT

A color imaging device comprises: one or more arrays (10, RA, GA, BA) of color selective photodetectors (R, G, B) configured to acquire a color image of a subject; a set of avalanche photodiode photodetectors (APD) arranged to acquire a luminance image of the subject; and digital image processing circuitry (30) configured to process the acquired color image and the acquired luminance image to generate an output image of the subject. In some embodiments the avalanche photodiode photodetectors are configured to perform photon counting. In some embodiments, the one or more arrays comprise an imaging array (10) including the color-selective photodetectors (R, G, B) distributed across the imaging array with the set of avalanche photodiode photodetectors (APD) interspersed amongst the color-selective photodetectors.

16 Claims, 5 Drawing Sheets

(56) References Cited

U.S. PATENT DOCUMENTS

Figure 1:
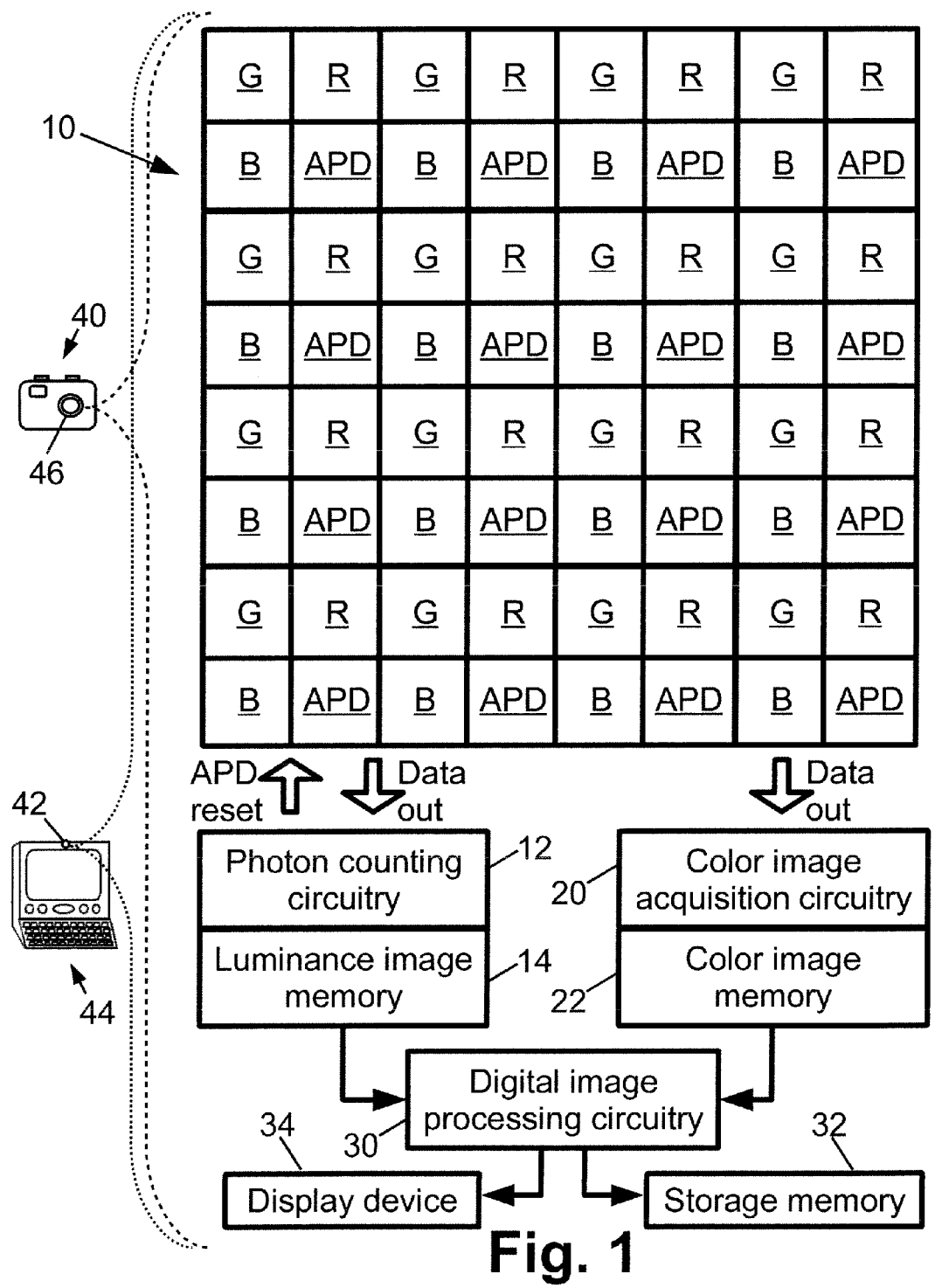

| | | |
|---|---|---|
| 6,658,329 B1 | 12/2003 | Howard et al. |
| 6,841,816 B2 * | 1/2005 | Merrill et al. .................. 257/294 |
| 6,885,398 B1 * | 4/2005 | Sladen .......................... 348/273 |
| 7,262,402 B2 * | 8/2007 | Niclass et al. ............. 250/214.1 |
| 7,268,499 B2 * | 9/2007 | Tanada ....................... 315/169.3 |
| 7,326,905 B2 * | 2/2008 | Kuhara et al. ............. 250/214 R |
| 7,547,872 B2 * | 6/2009 | Niclass et al. ............. 250/214 R |
| 8,125,543 B2 * | 2/2012 | Cho .............................. 348/241 |
| 2003/0048493 A1 * | 3/2003 | Pontifex et al. ................ 358/514 |
| 2004/0178463 A1 * | 9/2004 | Merrill et al. .................. 257/440 |
| 2004/0178464 A1 * | 9/2004 | Merrill et al. .................. 257/440 |
| 2004/0178465 A1 * | 9/2004 | Merrill et al. .................. 257/440 |
| 2004/0178466 A1 * | 9/2004 | Merrill et al. .................. 257/440 |
| 2005/0010081 A1 * | 1/2005 | Doguchi et al. ............... 600/109 |
| 2005/0248667 A1 * | 11/2005 | Schweng et al. ............. 348/234 |
| 2006/0044427 A1 * | 3/2006 | Hu ................................ 348/266 |
| 2006/0106306 A1 * | 5/2006 | Essner et al. .................. 600/436 |
| 2006/0131480 A1 * | 6/2006 | Charbon et al. ............ 250/214.1 |
| 2006/0146064 A1 * | 7/2006 | Schweng et al. ............. 345/589 |
| 2006/0146067 A1 * | 7/2006 | Schweng et al. ............. 345/591 |
| 2006/0192086 A1 * | 8/2006 | Niclass et al. ............. 250/214.1 |
| 2006/0226374 A1 * | 10/2006 | Rigler et al. ................ 250/458.1 |
| 2007/0057211 A1 * | 3/2007 | Bahlman et al. .............. 250/584 |
| 2007/0194213 A1 * | 8/2007 | Augusto .................... 250/214.1 |
| 2008/0130073 A1 | 6/2008 | Compton et al. |
| 2008/0130991 A1 | 6/2008 | O'Brien et al. |
| 2008/0135727 A1 * | 6/2008 | Hillis et al. ................. 250/208.1 |
| 2008/0170007 A1 * | 7/2008 | Tanada ............................ 345/76 |
| 2008/0212070 A1 * | 9/2008 | Pawlak et al. ................... 356/36 |
| 2008/0225241 A1 * | 9/2008 | Chen et al. ....................... 353/85 |
| 2008/0231738 A1 * | 9/2008 | Iida .............................. 348/308 |
| 2008/0240543 A1 * | 10/2008 | Budach et al. ................ 382/141 |
| 2008/0279441 A1 * | 11/2008 | Matsuo et al. ................ 382/133 |
| 2009/0008566 A1 * | 1/2009 | Agarwal et al. .......... 250/370.11 |
| 2009/0060381 A1 * | 3/2009 | Dunki-Jacobs ............... 382/275 |
| 2010/0014088 A1 * | 1/2010 | Wiki ............................ 356/445 |
| 2010/0123120 A1 * | 5/2010 | Mohseni ........................ 257/21 |
| 2011/0101201 A1 * | 5/2011 | Venezia et al. ............... 250/200 |
| 2011/0101481 A1 * | 5/2011 | Nozaki ......................... 257/432 |
| 2011/0164158 A1 * | 7/2011 | Iida .............................. 348/294 |
| 2011/0210239 A1 * | 9/2011 | Sutko et al. ................... 250/234 |

FOREIGN PATENT DOCUMENTS

| | | |
|---|---|---|
| WO | 2008066699 A2 | 6/2008 |
| WO | 2008069920 A1 | 6/2008 |
| WO | 2008150021 A1 | 12/2008 |

* cited by examiner

COLOR CMOS IMAGER WITH SINGLE PHOTON COUNTING CAPABILITY

CROSS REFERENCE TO RELATED APPLICATIONS

This applications claims the benefit of U.S. provisional application Ser. No. 61/139,739 filed Dec. 22, 2008, which is incorporated herein by reference.

The following relates to the imaging arts, photographic arts, audio/video arts, remote communication arts, and related arts.

Digital imaging is used in diverse applications such as digital cameras, web cameras ("webcams"), audio/video cameras ("camcorders"), and so forth. In a known approach, a CMOS imager is employed, in which an array of broadband photodetectors are coupled with color-selective filters to define color-selective photodetectors. In consideration of relative light detection sensitivity factors for different colors, such CMOS color imaging arrays sometimes employ a Bayer pattern that includes 50% green photodetectors, 25% blue photodetectors, and 25% red photodetectors. The color-selective photodetectors are biased through a reset transistor, and impingement of light generates a detectable voltage reduction. To provide sensitivity to low light levels, the voltage can be amplified by suitable amplification circuitry.

A known problem with CMOS imagers is that they have poor sensitivity to low light conditions, even when operated in conjunction with signal amplification circuitry. One source of light intensity loss is the color-selective filters. For a given light intensity, each color-selective filter typically removes about two-thirds of the light (corresponding to the non-selected colors), although the filtering loss is dependent upon the type of filter used.

One solution to this problem is to intersperse "panchromatic" photodetectors amongst the color-selective photodetectors of the color imaging array. The panchromatic photodetectors are similar to the color-selective photodetectors, but do not have color-selective filters. The panchromatic photodetectors generate a luminance image, which is an image of light intensity substantially independent of light color or wavelength, as acquired by broadband or panchromatic photodetectors. (It will be appreciated that the luminance image may still have some wavelength dependence due to possible non-flat light sensitivity-versus-wavelength dependence of the broadband or panchromatic photodetectors.) Digital image processing circuitry combines the color image generated by the color-selective photodetectors and the luminance image generated by the broadband or panchromatic photodetectors to generate an output image. Some systems employing such interspersed color-selective and panchromatic photodetectors are described, for example, in U.S. Publ. Appl. No. 2008/0130991 A1 and in U.S. Publ. Appl. No. 2008/0130073 A1.

The approach of interspersing color-selective and panchromatic photodetectors in a color imaging array improves light sensitivity due at least to the removal of the color-selective filters in the panchromatic photodetectors. A further advantage is that the electronics are similar for both the color-selective and panchromatic photodetectors, which simplifies imaging array fabrication.

However, the improvement in light intensity sensitivity using this approach is limited, and is influenced by the tradeoff between color-selective and panchromatic photodetector densities in the imaging array. In some arrays disclosed of U.S. Publ. Appl. No. 2008/0130991 A1 and in U.S. Publ. Appl. No. 2008/0130073 A1, about one-half of the array comprises panchromatic photodetectors. This high density of panchromatic photodetectors in the array can be expected to adversely affect color sensitivity and color differentiation capabilities of the array. Moreover, even with the color-selective filters omitted, the light sensitivity of the panchromatic portion of the imaging array is limited due to the noise of the detector itself.

The following provides new and improved apparatuses and methods which overcome the above-referenced problems and others.

In accordance with one disclosed aspect, a color imaging device comprises: one or more arrays of color-selective photodetectors configured to acquire a color image of a subject; a set of avalanche photodiode photodetectors arranged to acquire a luminance image of the subject; and digital image processing circuitry configured to process the acquired color image and the acquired luminance image to generate an output image of the subject.

In accordance with another disclosed aspect, a color imaging device comprises: a set of avalanche photodiode photodetectors configured to perform photon counting and arranged to acquire a luminance image of the subject; and digital image processing circuitry configured to process the acquired luminance image of the subject and a color image of the subject to generate an output image of the subject.

In accordance with another disclosed aspect, a color imaging device comprises an imaging array including color-selective photodetectors distributed across the imaging array and a set of avalanche photodiode photodetectors interspersed amongst the color-selective photodetectors.

In accordance with another disclosed aspect, a color imaging method comprises: imaging a subject using one or more arrays of color selective photodetectors configured to acquire a color image of a subject and a set of avalanche photodiode photodetectors arranged to acquire a luminance image of the subject; and adjusting the color image based on corresponding content of the luminance image to generate a modified color image.

One advantage resides in providing color imaging with improved intensity range.

Another advantage resides in providing color imaging with depth of field information.

Another advantage resides in providing color imaging with amplification.

Further advantages will be apparent to those of ordinary skill in the art upon reading and understand the following detailed description.

FIG. 1 diagrammatically shows a color imaging device that includes an imaging array comprising color-selective photodetectors and an interspersed set of avalanche photodiode (APD) photodetectors.

Figure 2:
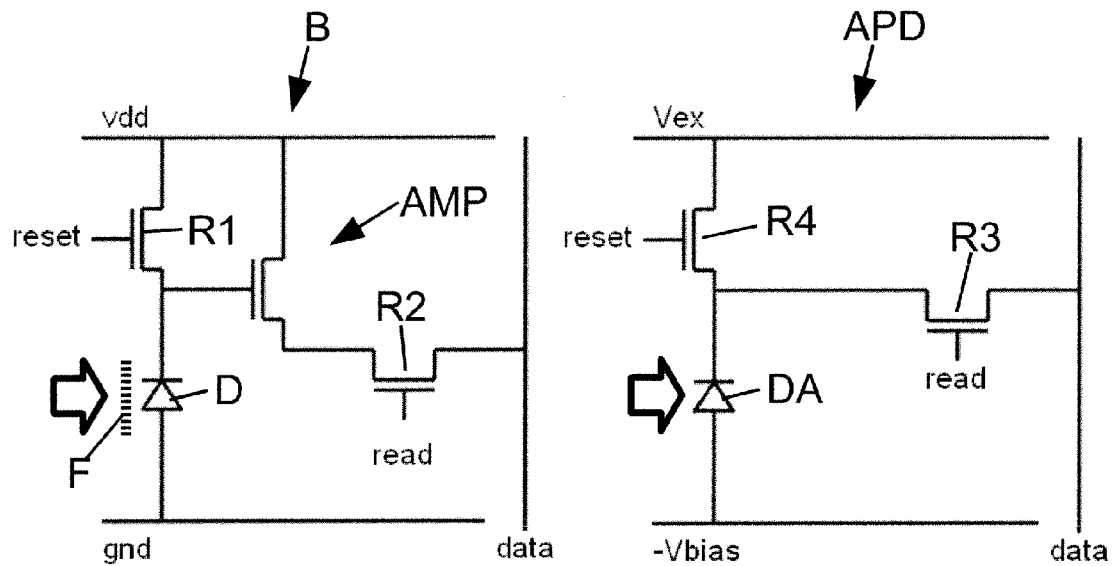

FIG. 2 diagrammatically shows an electrical schematic of an illustrative blue photodetector of the color imaging device of FIG. 1, and an electrical schematic of an illustrative APD photodetector of the color imaging device of FIG. 1.

Figure 3:
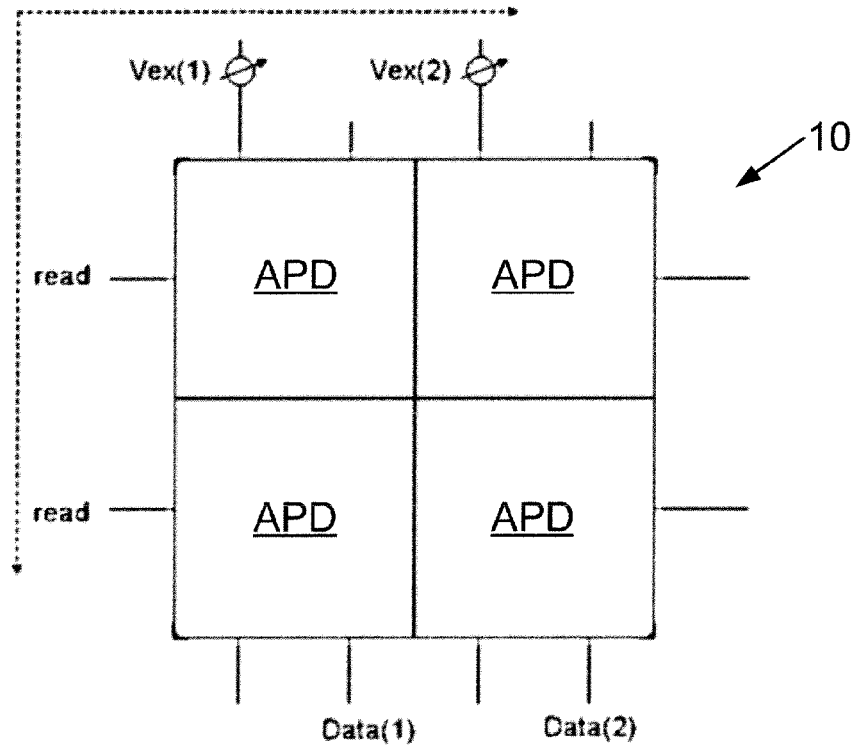

FIG. 3 diagrammatically shows a readout sequence for reading out the set of APD photodetectors of the imaging array of FIG. 1.

Figure 4:
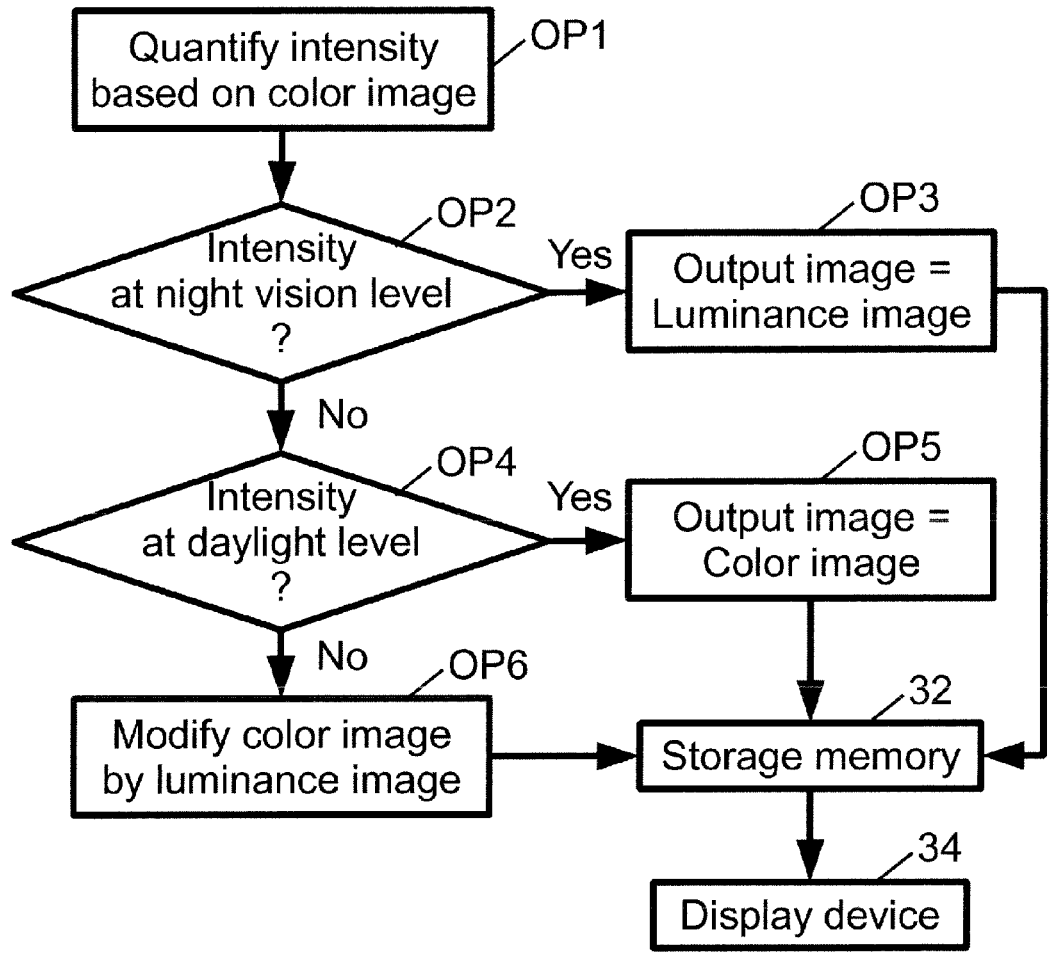

FIG. 4 diagrammatically shows a flow chart of illustrative processing suitably performed by the digital image processing circuitry of the color imaging device of FIG. 1.

Figure 5:
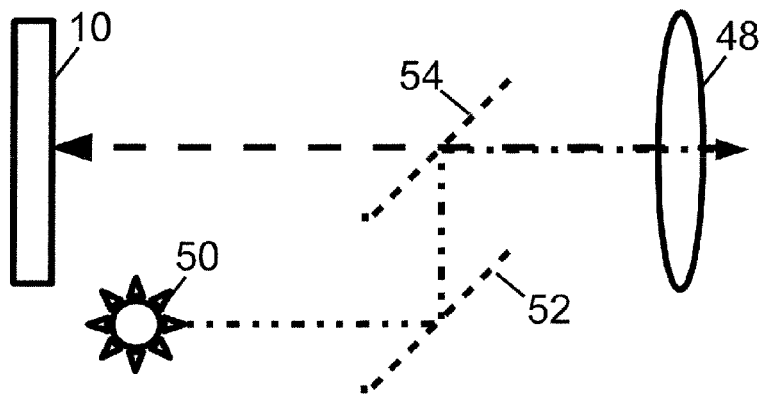

FIG. 5 diagrammatically shows imaging optics suitably used in the color imaging device of FIG. 1, which in the embodiment of FIG. 5 include a light source for acquiring depth information using the set of APD photodetectors.

Figure 6:
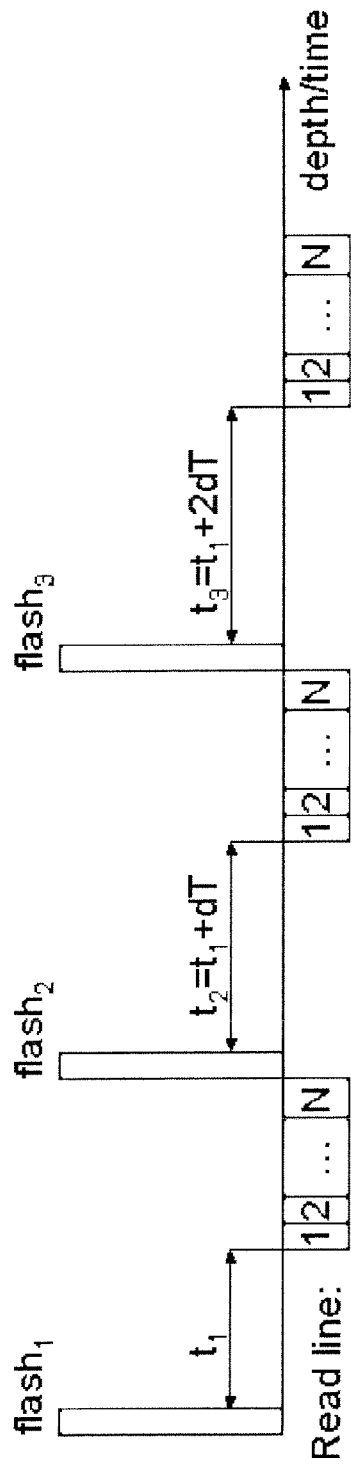
Figure 7:
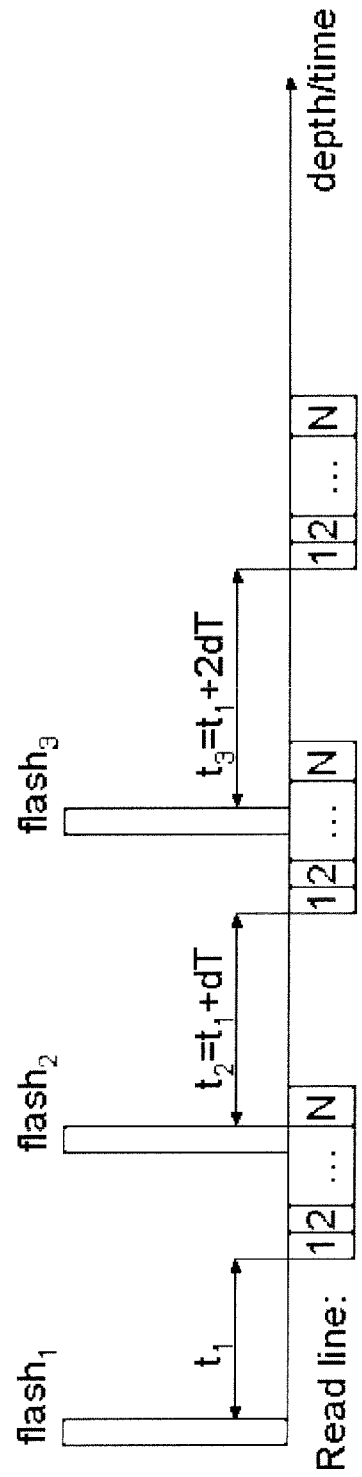

FIGS. 6 and 7 diagrammatically show timing diagrams for acquiring depth information using the embodiment of FIG. 5.

Figure 8:
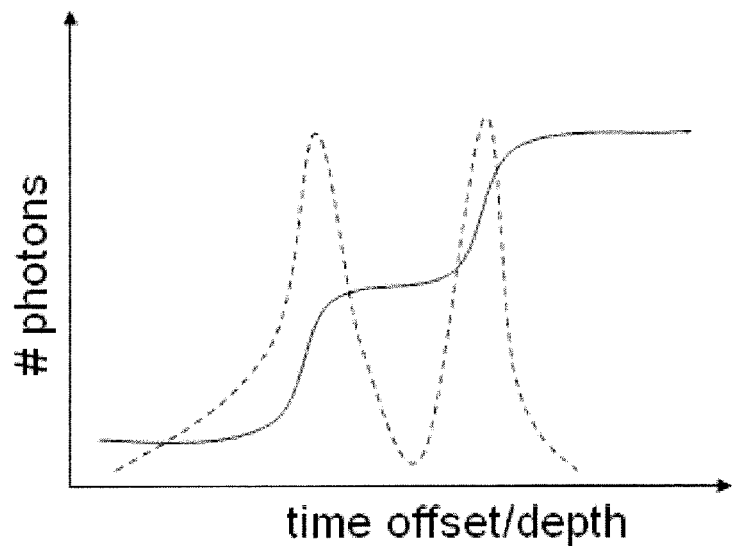

FIG. 8 diagrammatically plots photon counts as a function of time offset or depth acquired using the depth estimation approach of FIG. 6 or of FIG. 7.

Figure 9:
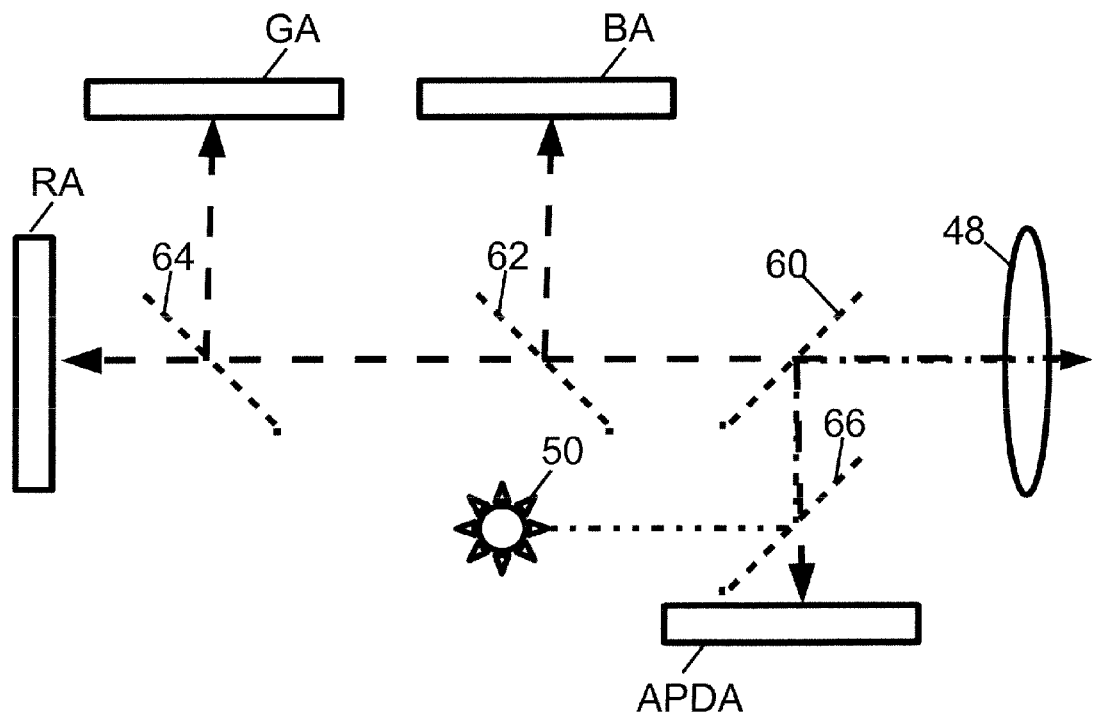

FIG. 9 diagrammatically shows another embodiment in which the color-selective photodetectors are segregated into mono-color arrays, the set of APD photodetectors is segregated into an APD array, imaging optics couple light to these arrays, and a light source is provided for acquiring depth information using the APD array.

With reference to FIGS. 1 and 2, a color imaging array 10 includes an array of color selective photodetectors configured to acquire a color image of a subject. In the illustrated imaging array 10, the color selective photodetectors include: red photodetectors R configured to detect red light; green photodetectors G configured to detect green light; and blue photodetectors B configured to detect blue light. The color imaging array 10 further includes a set of avalanche photodiode (APD) photodetectors APD arranged to acquire a luminance image. An electrical schematic of an illustrative blue photodetector B is depicted in FIG. 2. In this illustrative example, the blue photodetector B is a CMOS photodetector including a photodiode D that is pre-charged to a low voltage bias vdd through a reset transistor R1. During the acquisition, electron-hole pairs are photo-generated in the depletion region of the diode D, which lowers the voltage level across the diode D. The diode D can be substantially any type of photodiode, such as a P-I-N photodiode, an avalanche photodiode, or so forth. The voltage is amplified by a source-follower circuit AMP and can be read out through a readout transistor R2. The photodiode D is a broadband photodiode which would in general detect light of substantially any visible wavelength. Accordingly, a color-selective filter F is included to block light other than blue light from reaching the photodetector D. The red and green photodetectors R, G are similar, except that they utilize red-selective and green-selective filters, respectively.

FIG. 2 also depicts an electrical schematic of an illustrative APD photodetector APD, which includes an avalanche photodiode DA. An avalanche photodiode is a photodiode that provides internal signal amplification through an avalanche process. The avalanche photodiode DA is reverse-biased at a bias level Vex that is sufficiently high so that photogenerated electrons and holes are accelerated by the internal bias field to generate avalanche multiplication of carriers so as to produce substantial gain. The electrical schematic of FIG. 2 configures the avalanche photodiode DA in Geiger mode for photon counting. In other embodiments, a lower bias level can be used to produce avalanche multiplication. In some contemplated embodiments, the same circuit topology as is used for the red, green, and blue photodetectors R, G, B (an illustrative example being depicted in the lefthand side of FIG. 2) is also used to operate the avalanche photodiode DA, with avalanche multiplication being obtained in the avalanche photodiode DA due to a high internal electric field provided by the p/n junction design of the avalanche photodiode DA. The gain provided by the avalanche photodiode DA means that for every absorbed photon, a cascade of electrons and holes is generated internally within the avalanche photodiode DA. The gain depends upon, among other factors, the bias level Vex.

For a sufficiently high bias level a detectable current pulse is generated responsive to absorption of a single photon, which enables the avalanche photodiode DA to be optionally operated in a Geiger mode to perform photon counting. The electrical schematic of an illustrative APD photodetector APD depicted in FIG. 2 is configured for Geiger mode operation. The diode DA is charged to few volts above the breakdown voltage by the bias level Vex, and a readout transistor R3 senses if the avalanche photodiode DA has absorbed a photon. Photons are counted sequentially by reading each photodiode DA at successive intervals. In an array configuration, the READ signal of one line can optionally be used as the RESET signal of the previous line.

The avalanche photodiodes DA of the APD photodetectors APD are typically configured to count any photon in the visible spectrum. Accordingly, the image acquired by the set of APD photodetectors APD is a luminance or grayscale image. However, it is contemplated for the spectral response of the avalanche photodiodes DA to have some wavelength dependence, such as (for example) a sensitivity peak near the middle of the visible spectrum, and/or a sensitivity decrease toward the infrared region and/or toward the ultraviolet region. Illustrated photon counting circuitry 12 operates the APD photodetectors APD in Geiger mode to generate a luminance image based on photon counts acquired using the APD photodetectors APD. The photon counting circuitry 12 receives data output by the set of APD photodetectors APD, and optionally also sends control signals to reset APD photodetectors APD that have been "triggered" by impingement of a photon. Alternatively, the resetting of the APD photodetectors APD may be performed by suitable reset circuitry integrated with each APD photodetector APD. The luminance image acquired by the photon counting circuitry 12 is stored or buffered in a suitable luminance image memory 14.

In some embodiments, a modification of the APD readout method uses the set of APD photodetectors APD of the imaging array 10 and varies the excess voltage of each avalanche photodiode DA (that is, varies the bias voltage Vex) to match the photon detection efficiency to the expected photon flux. In these embodiments, the bias voltage Vex is different for different avalanche photodiodes DA of the set of APD photodetectors APD of the imaging array 10. The bias variation can be selected using a lookup table associating bias value for the avalanche photodiode with current in one or more of the neighboring color selective photodetectors R, G, B. This current value is suitably multiplied by the inverse of the photon detection efficiency to account for the reduced photon detection efficiencies at low values of the bias voltage Vex.

With brief reference to FIG. 3, a fast parallel readout scheme can be used to achieve luminance image readout rates of more than 1 million frames per second. As diagrammatically shown in FIG. 3, this rapid readout rate can be realized by reading two halves of the array 10 at the same time and by using more than one data line per column to allow the readout of several lines at the same time.

Although photon counting circuitry 12 is illustrated, in other embodiments the luminance acquisition circuitry operates the APD photodetectors APD in a non-Geiger mode, for example by biasing the APD photodetectors APD at a lower level so that the APD photodetectors APD provide substantial gain but are not capable of performing individual photon counting as in the Geiger mode. Such a non-Geiger mode still provides intrinsic gain due to avalanche multiplication during breakdown of the junction, so as to provide good sensitivity to low light intensity.

Color image acquisition circuitry 20 acquires image data from the color-selective photodetectors R, G, B of the imaging array 10, and buffers or stores the resulting color image in a color image memory 22. The color-selective photodetectors R, G, B and associated color image acquisition circuitry 20 suitably operate in accordance with a typical color image device employing a CMOS imaging array. However, because some pixels of the display are occupied by grayscale APD photodetectors APD rather than by color-selective photodetectors R, G, B, some scaling of the various color channels may be appropriate. In the illustrated imaging array 10, for example, densities of the red, green, blue, and APD photodetectors R, G, B, APD in the array 10 are about 25%, 25%, 25%, and 25%, respectively. That is, about 25% of the photodetectors are red photodetectors R; about 25% of the photodetectors are green photodetectors G; about 25% of the photodetectors are blue photodetectors B; and about 25% of the photodetectors are APD photodetectors APD. The array 10 is obtained by starting with a conventional Bayer pattern that includes 50% green photodetectors, 25% blue photodetectors, and 25% red photodetectors, and replacing about one-half of the green photodetectors with APD photodetectors. As a consequence, the green channel intensity of the raw image will be reduced by one-half as compared with the conventional Bayer pattern. The color image acquisition circuitry 20 accommodates this reduction in density of green photodetectors G by suitable scaling of the green image channel.

With returning reference to FIG. 1 and with further reference to FIG. 4, digital image processing circuitry 30 is configured to process the acquired color image and the acquired luminance image to generate an output image. FIG. 4 illustrates one suitable algorithm for generating the output image. In a first operation OP1, the image intensity is quantified based on the color image. This quanitification can employ an average image intensity, average image intensity per color channel, or other suitable metric. In some embodiments, the image intensity quantification operation OP1 is performed for sub-regions of the image to enable piecemeal processing of the image. Moreover, the image intensity quantification operation OP1 is optionally replaced by another metric of the color image "quality" such as an image contrast metric.

The image intensity metric is compared with a intensity night vision level threshold in a comparison operation OP2. The objective of this comparison is to determine whether the light intensity is too low for the color image to be useful. Again, other image "quality" metrics such as image contrast can be used. (In the latter metric, for example, a color image whose image contrast is below a threshold may be assumed to be too dim to be useful). If the comparison operation OP2 indicates that the color image is not useful, then it is assumed that the problem is that the light intensity is too low. In this case, the output image is selected as the acquired luminance image in a selection operation OP3. Although the luminance image has the disadvantage of not being in color (that is, it is a grayscale image), the photon counting capability of the set of APD photodetectors APD and associated acquisition circuitry 12 ensures that the luminance image is likely to have useful contrast even in very low light conditions. The output image is somewhat analogous to the output of "night vision goggles" or similar devices.

On the other hand, if the comparison operation OP2 indicates that the color image is useful, then a second comparison operation OP4 determines whether the color image has intensity corresponding to daylight level. If so, then it is reasonable to assume that the photon counting set of APD photodetectors APD is fully saturated, and accordingly the luminance image is washed out and not useful. In such a case, a second selection operation OP5 selects the color image as the output image.

Finally, if both comparison operations OP2, OP4 are negative, then it is determined that the color image is useful but may be improved based on grayscale information provided by the luminance image. In such a case, a color image modification operation OP6 is performed which adjusts the color image based on corresponding content of the luminance image. In a computationally straightforward approach, the modification operation OP6 optionally increases intensity of the red, green, and blue channels of each pixel of the color image by an amount based on the luminance value of the corresponding pixel of the luminance image. In a variant approach, such intensity enhancement is limited to those regions of the luminance image that have luminance values above a minimum threshold (so that the luminance image is indicating some light is present) and below a maximum threshold (since above such a threshold it may be assumed that the color image successfully captured the higher intensity light). Other compositional approaches for modifying the color image based on the luminance image may be used, such as those disclosed in U.S. Publ. Appl. No. 2008/0130991 A1 and in U.S. Publ. Appl. No. 2008/0130073 A1, both of which are incorporated herein by reference in their entirety.

With continuing reference to FIGS. 1 and 4, the output image generated by one of the operations OP3, OP5, OP6 is suitably stored in a storage memory 32, displayed on a display device 34, or otherwise utilized. In embodiments in which the imaging array 10 is a CMOS device, it is contemplated to integrate various components 12, 14, 20, 22, 30, 32, 34 or various combinations of said components monolithically on a single silicon wafer, chip, or die to produce an integrated imaging device. Alternatively, various components 12, 14, 20, 22, 30, 32, 34 or various combinations of said components may be embodied as separate chips, dies, or so forth, some of which may optionally be fabricated in something other than a silicon-based material system. Whether integrated or separate, the circuitry components 12, 20, 30 or various portions thereof may be variously embodied as discrete circuitry, integrated circuitry, a suitably programmed microprocessor or microcontroller, or so forth.

The color imaging device may be a component of, or may be embodied as, substantially any color imaging application device, such as an illustrated digital camera 40 (which may, for example, be a compact digital camera such as are typically used by amateur photographers, or a digital single-lens reflex (SLR) camera such as are typically used by more advanced or professional photographers, or so forth), or a webcam 42 integral with or installed on a computer 44, or so forth. The imaging array 10 may view an imaging subject directly, or may be optically coupled with a subject to be imaged by a suitable optical system, such as an illustrated lens 46 of the digital camera 40, or a lens system (not shown) of the webcam 42, or so forth. Moreover, although consumer- or business-related application devices 40, 42 are illustrated, it is contemplated that the color imaging devices disclosed herein may find application in other application domains such as in medical imaging (for example, as a component of or embodied in an endoscopic device configured for insertion into a subject for internal imaging of the subject under low-light or shadowed conditions), or as a component of or embodied in video equipment for capturing sporting events, and so forth.

Integration of the set of APD photodetectors APD in the color imaging array 10 has numerous advantages. When operated in Geiger mode, the set of APD photodetectors APD extend imaging capability to extremely low light levels, albeit in grayscale. At higher light levels that are still below full daylight illumination, the set of APD photodetectors APD provide a high gain luminance image acquired in Geiger mode or in a less aggressive avalanche multiplication gain mode that can be used to modify or adjust the color image to provide enhanced image contrast or other image enhancement. Because of the high gain provided by the APD photodetectors APD, these substantial advantages can be obtained without replacing a large fraction or percentage of the color-selective photodetectors R, G, B with APD photodetectors APD. In some embodiments, the APD photodetectors of the set of APD photodetectors make up less than or about one-fourth of the total number of photodetectors of the imaging array. For example, in the illustrative imaging array 10, the APD photodetectors APD make up precisely one-fourth of the photodetectors of the imaging array.

With reference to FIG. 5, in some embodiments the set of APD photodetectors APD are used to acquire depth information. FIG. 5 depicts the color imaging array 10 arranged respective to an optical system 48 to image a subject. An optional light source 50, such as a pulsed laser, is coupled into the optical system 48 using a first prism or mirror 52 and a second prism or mirror 54 that is partially reflective and partially transmissive. The optional pulsed laser or other light source 50 generates a light pulse that travels through the optical system 48, reflects (at least in part) off of the subject, the (at least partially) reflected light is collected by the optical system 48 and imaged by the imaging array 10. The set of APD photodetectors APD operating in Geiger mode are configured with sufficient temporal resolution to detect the delay time between activation of the optional light source 50 and photon counts acquired by the set of APD photodetectors APD responsive to the light pulse generated by activation of the optional light source 50.

In one embodiment providing depth information, the light source 50 is a pulsed semiconductor laser, pulsed light-emitting diode, or other pulsed narrowband light source, and the APD photodetectors APD are covered by a narrow-band filter tuned to the wavelength of the light source 50 to block ambient light from being detected. In some such embodiments, the prism or mirror 54 is almost completely transmissive for most of the visible spectrum (for example, by being made out of glass or another highly transparent material), but is made partially reflective for the wavelength of the light source 50 by disposing on the prism or mirror 54 dielectric layers defining a narrow-band Bragg reflector tuned to have peak reflectance at the wavelength of the light source 50.

To perform depth estimation, the photon counting circuitry 12 includes time-to-digital converters that generate a time index corresponding to each photon count. The time index is then compared with the time of activation of the light source 50 to ascertain the round trip travel time of the light, from which the distance can be determined as $d=c \cdot t/2$ where c denotes the speed of light, t denotes the round-trip travel time (that is, the time between activation of the light source 50 and photon count), and d denotes the depth.

Typically, a substantial number of time-to-digital converters are employed to achieve high depth resolution in the centimeter range. However, if a high depth resolution is not required, then a less complex scheme can be employed.

With reference to FIG. 6, in this less complex scheme the sensor lines are read out sequentially with a well defined time step of typically few nanoseconds. So, the depth difference between two subsequent lines is in the order of few tens of centimeters. By changing the time offset between activation of the light source 50 and the start of the APD photodetectors readout, the entire depth range is covered by all the lines. In this approach, the scene is illuminated by several millions of short light pulses with slowly increasing time step and frames are collected for every depth of the scene.

With reference to FIG. 7, in a variant scheme that further speeds up the readout (that is, collects more frames to gain better statistics) the light pulses can be interleaved with the readouts.

With reference to FIG. 8, when using the depth estimation scheme of FIG. 6 or of FIG. 7, for each pixel the received photons are suitably collected in depth histograms. Each bin of the histogram contains the number of photons received by the pixel with a time-of-flight less than or equal the depth d. FIG. 8 diagrammatically shows an example of such a histogram for two objects at two different distances. The histogram is plotted using a solid line in FIG. 8. The derivative of the histogram is plotted using a dashed line in FIG. 8. The two peaks in the derivative of the histogram (dashed line) correspond to the depth positions of the two viewed objects (the two viewed objects are either along different lines of sight, or the front object is a transparent object such as a window pane) or two distinct portions of a single viewed object spanning different depth positions. More generally, each peak in the histogram derivative corresponds to the depth of an object. The differentiation of the histogram increases the noise. Accordingly, the number of measurements (corresponding to the number of light source activation events and corresponding acquisitions) should be sufficient to provide depth localization of the objects at the desired noise level. Noise reducing signal processing techniques can also be applied.

In the embodiment of FIGS. 1 and 5, the imaging array is a single integrated imaging array in which the APD photodetectors APD are interspersed with the color-selective photodetectors R, G, B. This approach facilitates fabrication of a compact color imaging device, and also ensures spatial registration of the acquired color image and the acquired luminance image. However, the integrated approach can make manufacturing more difficult. Additionally, replacing a conventional color imaging array with the integrated imaging array 10 entails modification of both the color imaging array and of coupling electronics of the color image acquisition circuitry.

With reference to FIG. 9, in an alternative approach an APD photodetectors array APDA is included as an add-on component of an existing color imaging system. The existing color imaging system can use a color imaging array with red, green, and blue photodetectors (variation not illustrated), or as illustrated can use a separate red photodetector array RA, green photodetector array GA, and blue photodetector array BA. In the embodiment of FIG. 9, the optical system 48 is again used to capture light from the subject, and partially reflective/partially transmissive prisms or mirrors 60, 62, 64 are used to couple selected fractions of the light from the subject to each of the imaging arrays RA, GA, BA, APDA. The color image is acquired by combining the color channel images generated by the respective three color-selective arrays RA, GA, BA, while the luminance image is generated by the APD photodetectors array APDA. Remaining components shown in FIG. 1, such as the digital image processing circuitry 30, can be utilized in the system of FIG. 9. In the illustrative alternative system of FIG. 9, the optional light source 50 is included for use in acquiring depth information, and is coupled into the optical system 48 via the partially reflective mirror 60 and an additional partially reflective/partially transmissive mirror 66.

In either embodiment of FIGS. 5 and 9, the light source 50 can also be configured to illuminate the subject via an optical pathway that does not include the optical system 48. For example, in some contemplated embodiments the light source 50 is arranged to directly illuminate the subject without any intervening optics.

The invention has been described with reference to the preferred embodiments. Modifications and alterations may occur to others upon reading and understanding the preceding detailed description. It is intended that the invention be con-

Having thus described the preferred embodiments, the invention is now claimed to be:

1. A color imaging device comprising:
an array of color-selective photodetectors including interspersed red, green, and blue photodetectors configured to acquire a color image of a subject, wherein the color-selective photodetectors are not avalanche photodiode photodetectors;
a set of avalanche photodiode photodetectors interspersed amongst color-selective photodetectors of the array of color-selective photodetectors;
photon counting circuitry operating the avalanche photodiode photodetectors in Geiger mode to generate a luminance image based on photon counts acquired using the avalanche photodiode photodetectors; and
digital image processing circuitry configured to process the acquired color image and the acquired luminance image to generate an output image of the subject.

2. The color imaging device as set forth in claim 1, wherein avalanche photodiode photodetectors comprise less than or about one-fourth of the total number of photodetectors of the array of photodetectors.

3. The color imaging device as set forth in claim 1, wherein the digital image processing circuitry is configured to adjust at least a portion of the acquired color image based on a corresponding portion of the acquired luminance image.

4. The color imaging device as set forth in claim 1, wherein the digital image processing circuitry is configured to generate depth information based on delay time between activation of a light source and photon counts acquired using the avalanche photodiode photodetectors.

5. The color imaging device as set forth in claim 1, wherein the digital image processing circuitry is configured to select the output image based on the illumination condition as one of: (i) the color image of the subject, (ii) the color image of the subject modified by the luminance image of the subject, and (iii) the luminance image of the subject.

6. The color imaging device as set forth in claim 1, wherein the array of color selective photodetectors and the set of avalanche photodiode photodetectors both comprise CMOS devices.

7. The color imaging device as set forth in claim 1, further comprising:
imaging optics optically coupling light from the subject to the array of color-selective photodetectors and to the set of avalanche photodiode photodetectors to enable acquisition of the color image and of the luminance image of the subject.

8. The color imaging device as set forth in claim 1, wherein the color imaging device comprises a digital camera or web camera.

9. The color imaging device as set forth in claim 1, wherein the color imaging device comprises a medical imaging device.

10. A color imaging device comprising:
an imaging array comprising color-selective photodetectors which do not include avalanche photodiodes;
a set of avalanche photodiode photodetectors integral with and distributed over the imaging array, the set of avalanche photodiode photodetectors configured to perform photon counting and arranged to acquire a luminance image of the subject; and
digital image processing circuitry configured to process the acquired luminance image of the subject and a color image of the subject to generate an output image of the subject.

11. The color imaging device as set forth in claim 10, further comprising:
a light source, the digital image processing circuitry configured to generate depth information based on delay time between (i) activation of the light source to illuminate the subject and (ii) acquisition of photon counts by the avalanche photodiode photodetectors.

12. A color imaging device comprising:
an imaging array comprising:
color-selective photodetectors distributed across the imaging array; and
a set of avalanche photodiode photodetectors interspersed amongst the color-selective photodetectors and Geiger mode circuitry configuring the avalanche photodiode photodetectors to acquire photon counts;
wherein the color-selective photodetectors do not include Geiger mode circuitry configuring the color-selective photodetectors to acquire photon counts.

13. The color imaging device as set forth in claim 12, wherein the color-selective photodetectors are P-I-N photodiodes, and the color-selective photodetectors further include color-selective filters.

14. A color imaging method comprising:
imaging a subject using (i) one or more arrays of color-selective photodetectors that do not include avalanche photodiodes and are configured to acquire a color image of a subject and (ii) a set of avalanche photodiode photodetectors interspersed amongst the color-selective photodetectors and arranged to acquire a luminance image of the subject; and
adjusting the color image based on corresponding content of the luminance image to generate a modified color image.

15. The color imaging method as set forth in claim 14, wherein the adjusting is selectively performed based on an illumination condition, and the color imaging method further comprises:
outputting the color image responsive to a daylight illumination condition; and
outputting the modified color image responsive an illumination condition lower than the daylight illumination condition.

16. The color imaging method as set forth in claim 15, further comprising:
outputting the luminance image responsive to a low light illumination condition that is lower than the daylight illumination condition.

* * * * *